Dec. 1, 1931.  C. O. LEE  1,834,065
LIQUID AND GAS SEPARATOR
Filed Nov. 1, 1929   2 Sheets-Sheet 2

Inventor
CLARENCE O. LEE

By Jesse P. Stone
Lester B. Clark  Attorneys

Patented Dec. 1, 1931

1,834,065

UNITED STATES PATENT OFFICE

CLARENCE O. LEE, OF FREEPORT, TEXAS, ASSIGNOR TO FREEPORT SULPHUR COMPANY, A CORPORATION

LIQUID AND GAS SEPARATOR

Application filed November 1, 1929. Serial No. 404,003.

The invention relates to a mechanism for converting an alternating flow of liquid and gas to constant flow of the separated liquid and gas.

The present invention is particularly related to separating sulphur and the gas with which it is associated in its recovery from the earth. Sulphur is usually mined by means of the Frasch process or modifications thereof, which constitute the passing of heated liquid into the sulphur-bearing formation so that the sulphur is melted and will accumulate in a sump or pit at the base of the eduction tube. In this manner the sulphur is raised to the surface intermittently with charges of gas so that the alternating heads or surges of sulphur and gas appear at the mouth of the well. In order to ascertain the production of the individual wells and to estimate the quantity of sulphur produced, it is desirable to pass the sulphur from each individual well through some type of a metering device before it is discharged into the receiving bin or passed into association with production from other wells. Before the liquid sulphur may be metered, however, it is necessary to separate it from the gas with which it emerges from the well.

It is one of the objects of the present invention to devise a separator which will convert the intermittent flow of liquid and gas to a constant flow of sulphur and to permit the escape of the gas.

Another object of the invention is to devise a separator wherein a head of liquid sulphur will be maintained which will be of greater weight and therefore exert a pressure greater than the gas pressure issuing from the well.

Still another object of the invention is to devise a separator having an inverted flow device which will permit gases entrapped in the sulphur to escape.

A still further object of the invention is to devise a separator wherein the gases may be separated from the sulphur and drawn off to be passed through a suitable scrubber or washing apparatus.

A still further object of the invention is to devise a separator which may be manipulated to divert a flow of air or water from the separator in the event the flow of sulphur ceases.

It is also one of the objects of the invention to devise a separator which may be jacketed in order to maintain the sulphur in molten condition and to provide in combination with the separator a level indicator.

Figure 1:
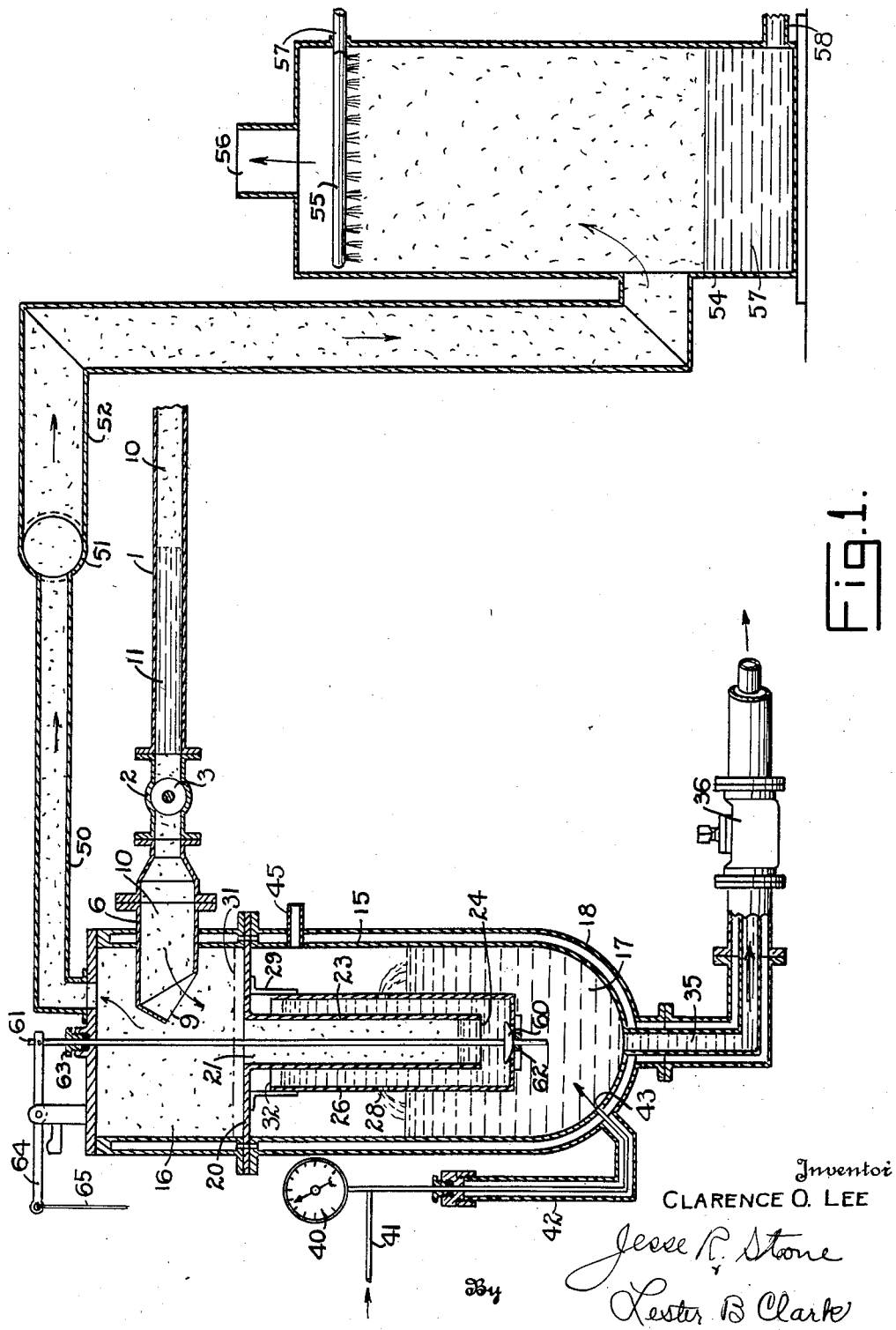

Other and further objects of the invention will be readily apparent when the following description is considered in connection with the accompanying drawings wherein Fig. 1 is a sectional view of the separator and scrubbing apparatus.

Figure 2:
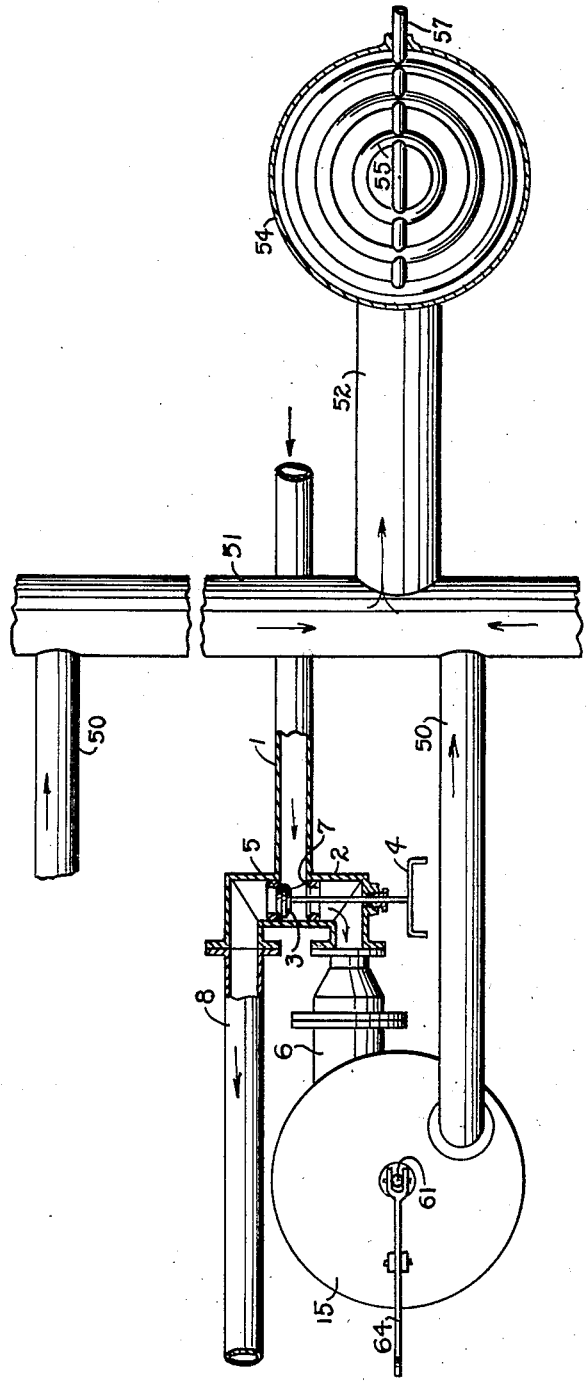

Fig. 2 is a top plan view of the mechanism, certain parts being broken away to illustrate the structure.

The discharge pipe from the well is indicated at 1. This pipe comprises an inlet for the separator or converter. This pipe, as best seen in Fig. 2, leads into a valve housing 2, which housing is provided with a valve 3 adapted to be manipulated by means of a handle 4. This valve is of the double seating type and is arranged to seat at 5 when it is desired to have the flow from the well enter the inlet 6 of the converter. However, when the flow of sulphur from the well ceases the valve may be moved to contact the seat 7 and in this manner permit the flow of gas or water through the blow pipe 8.

Fig. 1 shows the inlet pipe 6 in section and for purposes of illustration a head or surge of gas 10 is shown as entering the separator or converter. A head of sulphur 11 is shown in the pipe 1 on its way into the separator. In this manner it will be readily apparent that alternating surges of sulphur and gas enter the separator. This separator comprises a housing 15, which is made up of an upper chamber 16 and a lower receptacle 17. Both the chamber 16 and the receptacle 17 are shown as being enclosed within a jacket 18 so that steam or some other heating medium may be utilized to maintain the sulphur in a molten condition. The invention as here illustrated includes a partition 20, which is arranged to be retained by the upper and lower portions of the housing 15. This partition 20 is provided with a passage 21 which leads from the chamber 16 into the receptacle 17. The passage 21 is equipped with an inverted flow device or liquid seal which includes a tube 23, which may be formed integral with the partition or fastened thereto in any desired manner.

This tube is open at its lower end at 24. In this manner the sulphur entering the chamber 16 will flow by gravity into the passage 21 and down through the tube 23 to the lower end 24. A second tube 26 is shown as also suspended from the partition 20 and arranged co-axially with the tube 23. This second tube however is of larger diameter than the tube 23 and is closed at its lower end. In this manner the flow of sulphur from the tube 23 is reversed and caused to pass upwardly in the annular area between the two tubes. A plurality of orifices 28 are shown as arranged at the proper elevation in the outer tube 26. The size and number of these orifices, however, is an important feature of the invention and it is contemplated that various types of tubes 26 may be provided in order to obtain satisfactory operation of the device. The upper end of the tube 26 is supported from the partition 20 by means of brackets 29. The upper end of the tube 26 is shown as spaced from the partition so that an additional discharge area is thus provided in event the flow of sulphur greatly exceeds that being discharged by the orifices 28.

The flow of sulphur and gas from the well is usually under a pressure slightly greater than atmospheric and it is intended that the spacing of the orifices 28 in the tube 26 shall be at a distance above the lower end 24 of the tube 23 so that the weight of the sulphur in the annular space between the tubes will create a sufficient pressure upon the lower end of the tube 24 to prevent any entrance of gas.

When a head of sulphur enters the passage 21 it is contemplated that the tubes 26 and 23 will fill with sulphur and if the head is of sufficient volume it is likely that the tube 23 will be completely filled and it is possible that the sulphur may fill the housing up to a point such as indicated by the dotted line 31. When this occurs the sulphur will gradually discharge from the orifices 28 while the head of gas which immediately follows the head of sulphur is being discharged. It is intended that the orifices 28 be of such size that a constant flow of sulphur will be discharged therefrom and that no gas will pass through the lower end 24 of the tube 23. At the time that the sulphur accumulates up to a position such as the line 31, it is contemplated that sulphur will also during a short interval discharge over the upper end 32 of the tube 26.

As the sulphur discharges from the orifices 28 it will accumulate in the lower portion of the receptacle 17 from whence it may be drawn off through the discharge pipe 35. This pipe is also jacketed to maintain the sulphur in molten condition. A metering device is shown at 36. This metering device may assume various forms but does not form a part of the present invention.

In order to determine the amount of sulphur in the receptacle 17 I have provided a level indicator which includes a dial 40, which is connected to an air line 41. This air line is shown as being jacketed at 42 and entering the housing 15 at 43. With an indicator of this type an air pressure is maintained on the pipe 41 sufficient to cause a steady stream of air to be passed into the housing. The resistance to the entrance of this air is caused by the head of sulphur which is present in the receptacle. Any variation in the head is immediately indicated upon the dial 40 by the resistance which it presents to the entrance of the air. This dial may be suitably calibrated to indicate the quantity of sulphur, either by its height in inches, its volume or its weight, as desired. An exhaust opening 45 is shown in the receptacle 17 so that any gases which may separate from the sulphur while it remains in the receptacle may escape, also so that the air entering through the level indicator may escape. In this manner atmospheric pressure is maintained at all times within the receptacle. It should be noted also that the inlet pipe 6 has a nozzle 9 thereon which tends to direct the sulphur downwardly in the chamber 16.

In order that the gases may discharge or be drawn out of the chamber 16 a gas outlet 50 has been arranged. This outlet leads to a manifold 51 which may be arranged to receive the discharge gases from a plurality of separators. Leading from the manifold is a conduit 52 which leads to the washer or scrubber 54, the pipe 52 leading into the scrubber 54 at a point adjacent the base thereof.

Near the upper end of the housing 54 is shown a spray 55 from which water or any suitable liquid may be sprayed so that it comes into intimate contact with the gases which are passing into the scrubber. In this manner any particles of sulphur are removed from the gases and carried downwardly by the water or other liquid. The liquid also tends to absorb any obnoxious gases and odors which are present in the gas and to scrub the gas so that it may discharge from the passage 56 into the atmosphere and not be objectionable. The lower portion of the housing 54 has a receptacle to receive a quantity of liquid as at 57. This may be drawn off from the outlet 58 and filtered to recover the sulphur or disposed of in any desired manner.

When the flow from the well is to be discontinued the liquid which remains below the orifices 28 in the tube 26 can be drained by means of the valve 60. This valve is arranged upon a stem 61 and is adapted to close the seat 62 carried by the lower end of the tube 26. The stem 61 passes thru a stuffing box 63 in the upper end of the housing 15. This stem is arranged to be operated by means of a lever 64 and a pull rod 65. In this manner the sulphur may be drained while in molten condition and prevent its solidification within the separator.

It is apparent that various changes and alterations may be made in the different parts of the structure here disclosed without departing from the spirit of the invention which has in mind the provision of a simple and economical operating medium whereby the alternating heads of liquid and gas may be converted into a steady flow of liquid or gas which may be passed through a proper metering device in order that the quantity thereof may be determined.

What is claimed is:—

1. A device for converting an alternating flow of liquid and gas to separate streams of liquid and gas including a chamber to receive the alternating heads of liquid and gas, a liquid outlet at the base of said chamber, a gas outlet at the top of said chamber, said liquid outlet comprising a receptacle and two concentric tubes forming an inverted flow device whereby a head of liquid of sufficient weight to overcome the gas pressure in said chamber is maintained.

2. A device for converting an alternating flow of liquid and gas to separate streams of liquid and gas including a chamber to receive the alternating heads of liquid and gas, a liquid outlet at the base of said chamber, a gas outlet at the top of said chamber, said liquid outlet comprising a receptacle and an inverted flow device whereby a head of liquid of sufficient weight to overcome the gas pressure in said chamber is maintained, and means to drain said inverted flow device.

3. A separator for sulphur and gas including a housing, a chamber and a receptacle in said housing separated by a partition, a passage through said partition and a liquid seal device suspended from said partition and including a pair of concentric members whereby the sulphur forms a liquid seal to prevent a flow of gas into said receptacle, and means to discharge the gas from said chamber.

4. A separator for sulphur and gas including a housing, a chamber and a receptacle in said housing separated by a partition, a passage through said partition and a liquid seal device suspended from said partition and including a pair of concentric members whereby the sulphur forms a liquid seal to prevent a flow of gas into said receptacle, means to discharge the gas from said chamber, and air pressure means to indicate the liquid level in said receptacle.

5. A separator for sulphur and gas including a housing, a chamber and a receptacle in said housing separated by a partition, a passage through said partition and a liquid seal device suspended from said partition and including a pair of concentric members whereby the sulphur forms a liquid seal to prevent a flow of gas into said receptacle, and means to discharge the gas from said chamber, said housing being jacketed whereby the sulphur may be maintained in a liquid state.

6. A device for converting an intermittent flow of sulphur and gas to a steady flow of sulphur which may be metered, including a housing, means in said housing whereby the sulphur may flow downwardly by gravity and create a seal, and means in said housing to maintain a sufficient weight of sulphur to overcome the normal gas pressure existing in said housing.

7. A device for converting an intermittent flow of sulphur and gas to a steady flow of sulphur which may be metered, including a housing, means in said housing whereby the sulphur may flow downwardly by gravity and create a seal, means in said housing to maintain a sufficient weight of sulphur to overcome the normal gas pressure existing in said housing, and means to draw off the gas in said housing.

8. An apparatus for treating the discharge from sulphur wells to remove the gas therefrom including a separator, means in said separator to maintain a liquid seal of sulphur, including two concentric tubes arranged to support a column of sulphur which will balance the gas pressure in the separator and means to draw off the separated gas.

9. An apparatus for treating the discharge from sulphur wells to remove the gas therefrom including a separator, means in said separator to maintain a liquid seal of sulphur, and means to draw off the separated gas, said means to maintain the liquid seal of sulphur including a valve to remove the sulphur and allow it to discharge into said separator.

10. An apparatus for treating the discharge from sulphur wells to remove the gas therefrom including a separator, means in said separator to maintain a liquid seal of sulphur, means to draw off the separated gas, and a valve to drain the sulphur from said sealing means.

In testimony whereof I hereunto affix my signature this 22nd day of October A. D. 1929.

CLARENCE O. LEE.